(12) United States Patent
Kwon et al.

(10) Patent No.: US 8,334,354 B2
(45) Date of Patent: Dec. 18, 2012

(54) ETHYLENE COPOLYMER WITH IMPROVED IMPACT RESISTANCE

(75) Inventors: Seungbum Kwon, Daejeon (KR);
Hyeongtaek Ham, Daejeon (KR);
Choonsik Shim, Daejeon (KR);
Sungseok Chae, Daejeon (KR);
Myungahn Ok, Daejeon (KR); Daeho Shin, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 481 days.

(21) Appl. No.: 12/608,226

(22) Filed: Oct. 29, 2009

(65) Prior Publication Data

US 2010/0113729 A1 May 6, 2010

(30) Foreign Application Priority Data

Nov. 3, 2008 (KR) .................. 10-2008-0108457
Sep. 1, 2009 (KR) .................. 10-2009-0081845

(51) Int. Cl.
*C08F 210/02* (2006.01)
*C08F 10/02* (2006.01)

(52) U.S. Cl. ............ 526/348; 526/348.2; 526/348.3; 526/348.5; 526/348.6; 528/396

(58) Field of Classification Search ............ 526/348
See application file for complete search history.

(56) References Cited

U.S. PATENT DOCUMENTS

| | | | |
|---|---|---|---|
| 5,198,401 A | 3/1993 | Turner et al. | |
| 5,747,594 A * | 5/1998 | deGroot et al. | 525/240 |
| 6,469,103 B1 * | 10/2002 | Jain et al. | 525/240 |
| 6,932,592 B2 * | 8/2005 | Farley et al. | 425/523 |
| 2006/0235147 A1 | 10/2006 | Goyal et al. | |
| 2008/0273820 A1 * | 11/2008 | Wiker et al. | 383/103 |
| 2009/0192270 A1 * | 7/2009 | Malakoff et al. | 525/240 |

FOREIGN PATENT DOCUMENTS

| | | |
|---|---|---|
| JP | 2000-072819 | 3/2000 |
| KR | 10-2007-0104845 | 10/2007 |

\* cited by examiner

*Primary Examiner* — Rip A. Lee
(74) *Attorney, Agent, or Firm* — Clark & Brody

(57) ABSTRACT

Provided are ethylene copolymers with excellent impact resistance. More specifically, provided are ethylene copolymers satisfying certain correlation between the falling dart impact strength (F) or high rate impact resistant breakage energy (E) and Vicat softening point. The ethylene copolymers with improved impact properties are applicable to film, injection, compound, sheet, roto, pipe or blow molding.

11 Claims, 3 Drawing Sheets

ETHYLENE COPOLYMER WITH IMPROVED IMPACT RESISTANCE

TECHNICAL FIELD

The present invention relates to ethylene copolymers: more specifically, it relates to ethylene copolymer exhibiting enhanced impact resistance due to alteration of softening point which is an inherent property of the products; and applications of the same.

BACKGROUND ART

Mechanical properties of polyethylene resins depend on the molecular weight and molecular weight distribution, and the application field is selected accordingly. In general, the higher molecular weight of polyethylene resin provides the better mechanical properties thereof, but polyethylenes with high molecular weight have low fluidity to cause difficulties during the processing. This may result in serious disadvantage in extrusion or injection molding, which requires rapid deformation with high shear rate.

Thus studies have been performed on methods for improving mechanical properties of polyethylene product such as impact strength and creep property while maintaining the fluidity of polyethylene product, by copolymerizing ethylene with α-olefins such as 1-butene, 1-pentene, 1-hexene and 1-octene. Especially, the market requires the products having high impact resistance, which has been conventionally evaluated by falling dart impact strength or high rate impact strength depending on the process for preparation thereof (whether it is film formation or injection). When copolymerization of ethylene with α-olefin is carried out in order to improve the mechanical strength such as impact resistance as described above, however, rigidity is deteriorated because copolymer with relatively low density is obtained. Decreased rigidity of products intended for lighter and thinner ones may cause deformation when they are bent or stacked.

Accordingly, Japanese Patent Laid-Open No. 2000-72819 proposed ethylene homopolymers or copolymers of ethylene with not more than 10% by weight of C3~C20 α-olefin having (1) intrinsic viscosity $[\eta]=2\sim6$ dl/g; (2) density of 0.94~0.970 g/cm$^3$; (3) zerocia viscosity at 190° C. $\eta_0=2\times10^7\sim3\times10^8$ poise; (4) melt tensile strength (MT) and melt index under 21.6 kg of load (HLMI) satisfying the correlation: $MT\geq-12.4 \log HLMI+20.5$; and (5) high rate impact strength (HRI-IZOD) measured at −30° C. and HLMI satisfying the correlation: $HRI\text{-}IZOD\geq-\log HLMI+1.15$; which are manufactured by blown molding with restricted use for fuel tanks.

US Patent Publication No. 2006-0235147 proposes polyethylene having the density of 0.914~0.945 with excellent optical properties, low content of extractable substances, and excellent falling dart impact strength and high rate impact strength, for package material such as food package film, bags and pouches.

DISCLOSURE

Technical Problem

The object of the present invention is to provide ethylene copolymers having excellent processability and high impact property due to high rigidity.

Establishment of processing conditions for preparing ethylene copolymers with excellent impact resistance depends on the level of crystallization of the resin itself, such as softening point (at which the resin starts melting), as the factor for adjusting the processing condition. Another object of the invention is to provide ethylene copolymer showing the correlation of improved impact resistance with the change of softening point, and applications thereof.

Technical Solution

To achieve the objects of the present invention, the present invention provides copolymers of ethylene with (C3~C18) α-olefin comonomer, having the density of 0.900 to 0.940 g/cm$^3$, and falling dart impact strength (F) satisfying the correlation with Vicat softening point as expressed by Formulas (1) and $$F \geq 0.55 \times e^{(9.3011/(1+((V-59.4592)/76.3517)^2))}+15 \quad \text{[Formula 1]}$$

$$F \leq 1.7 \times e^{(9.3011/(1+((V-59.4592)/76.3517)^2))}+200 \quad \text{[Formula 2]}$$

wherein, V represents Vicat softening point measured according to ASTM D 1525; and F represents falling dart impact strength.

Now, the present invention is described in detail.

Formula (1) represents correlation of the falling dart impact strength with the softening point of ethylene copolymer having excellent impact resistance due to high rigidity. Falling dart impact strength depends upon the level of crystallization of the resin itself, but ethylene copolymers prepared by using conventional Ziegler-Natta catalyst cannot provide impact-resistant product with high rigidity, so that they cannot satisfy Formula (1). The ethylene copolymers of the present invention, which satisfies Formula (1), can be applied to products requiring lighter and thinner feature.

The present invention provides copolymers of ethylene with (C3~C18) α-olefin comonomer. The (C3~C18) α-olefin comonomer may be selected from propylene, 1-butene, 1-pentene, 4-methyl-1-pentene, 1-hexene, 1-octene, 1-decene, 1-dodecene, and mixtures thereof. Use of α-olefin comonomer gives fluidity to ethylene homopolymer, to result in ethylene copolymer of high molecular weight with enhanced mechanical properties such as impact resistance.

The content of α-olefin may be from 1 to 40% by weight, preferably from 1 to 30% by weight, more preferably from 1 to 20% by weight, on the basis of 100% by weight of the ethylene copolymer. If the content is less than 1% by weight, impact resistance of ethylene polymer would be poor, though rigidity of the ethylene polymer increases, and thus the polymer would have difficulties to be used for film, injection, compound, sheet or blown moldings requiring impact resistance. If the content exceeds 20% by weight, on the other hand, the rigidity would be poor, though impact resistance of the ethylene polymer increases, so that the polymer would have difficulties to be used alone for film, injection, compound, sheet, or blown moldings.

Further, the present invention provides ethylene copolymers having the density of 0.900~0.940 g/cm$^3$, preferably 0.910~0.930 g/cm$^3$. Density is a factor to determine mechanical strength including impact resistance of the ethylene copolymer. The ethylene copolymers having the density range as mentioned above are useful to be applied to film, injection, compound, sheet, or blown moldings requiring impact resistance.

In addition, the present invention provides ethylene copolymers having falling dart impact strength (F) satisfying the correlation with Vicat softening point as expressed by Formula (1) and Formula (2):

$$F \geq 0.55 \times e^{(9.3011/(1+((V-59.4592)/76.3517)^2))}+15 \quad \text{[Formula 1]}$$

$$F \leq 1.7 \times e^{(9.3011/(1+((V-59.4592)/76.3517)^2))}+200 \quad \text{[Formula 2]}$$

wherein, V represents Vicat softening point measured according to ASTM D 1525; and F represents falling dart impact strength.

Furthermore, the present invention provides ethylene copolymers satisfying Formula (3) as well as Formulas (1) and (2):

$$F \leq 1.5 \times e^{(9.3011/(1+((V-59.4592)/76.3517)^2))} + 150 \quad \text{[Formula 3]}$$

wherein, V represents Vicat softening point measured according to ASTM D 1525; and F represents falling dart impact strength.

More preferably, the present invention provides ethylene copolymers satisfying Formula (4) as well as Formulas (1) to (3):

$$F \leq 1.3 \times e^{(9.3011/(1+((V-59.4592)/76.3517)^2))} + 100 \quad \text{[Formula 4]}$$

wherein, V represents Vicat softening point measured according to ASTM D 1525; and F represents falling dart impact strength.

If the falling dart impact strength (F) is not within the range, the product would have low impact resistance and insufficient mechanical strength when being applied, thereby restricting the application in various field.

In addition, the present invention provides ethylene copolymers having excellent impact resistance, of which the impact resistant breakage energy (E) value satisfies Formulas (5) and (6):

$$E \geq 0.9 \times (-0.3306V + 57.898) \quad \text{[Formula 5]}$$

$$E \geq 1.2 \times (-0.3306V + 57.898) \quad \text{[Formula 6]}$$

wherein, V represents Vicat softening point measured according to ASTM D 1525; and E represents high rate impact resistant breakage energy value.

If the high rate impact resistant breakage energy (E) value is not within the range, impact resistance of the ethylene copolymer according to the present invention decreases to result in poor mechanical properties or rigidity.

Thus, the falling dart impact strength (F) or high rate impact resistant breakage energy (E) value of the present invention are factors depending on softening point of the ethylene copolymer. Accordingly, ethylene copolymers having excellent impact resistance can be prepared by controlling the softening point.

Further, the present invention provides ethylene copolymers having Haze value of 2~16. Haze value is another important factor of properties of the product when it is applied to film or moldings. Conventional ethylene copolymers of high rigidity prepared by using Ziegler-Natta catalyst show high Haze value with low transmission of visible ray to give difficulties in preparing clear products. The ethylene copolymers in accordance of the present invention have low Haze value and high transparency, so that products with excellent impact resistance with high transparency and high rigidity can be obtained therefrom.

The content of extractable substances (determined by measurement of volatiles) in the ethylene copolymer is from 0 to 3.0% by weight, preferably from 0.1 to 2.0% by weight. The measurement of volatiles can be determined from the data obtained from analytic method of temperature rising elution fractionation. It can be measured by proportion of the soluble fraction occurred by elution at 35° C. for 10 minutes to the overall crystallization peak. The content of extractable substances may be preferably not more than 3.0% by weight, since the residue from extraction after copolymerization may cause deterioration of physical properties including impact resistance.

The ethylene copolymer satisfying the requirements according to the invention can be included in single layered film, or in one or more layer(s) of multi-layered film.

In addition to film, the ethylene copolymer according to the invention can be applied to any industrial field including injected products which comprises the ethylene copolymer, compound products, sheets and blown moldings employing the same. But the use is not restricted what is mentioned above.

An example of process for preparing ethylene copolymer is described below, but the process is not restricted thereto.

1. Specification of the Catalyst Used

The catalyst used according to the present invention is a catalyst composition comprising the transition metal catalyst represented by Chemical Formula (1) and cocatalyst. The cocatalyst can be selected from boron compounds or aluminum compounds, or mixtures thereof.

First, the compound represented by Chemical Formula (1) is a Group 4 transition metal catalyst which comprises, around the transition metal, a cyclopentadiene derivative and at least one aryloxide ligand(s) having aryl derivative substituted at ortho-position, but does not comprise any linkage between the ligands.

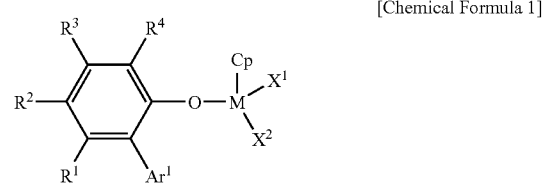

[Chemical Formula 1]

In the chemical formula, M represents transition metal from Group 4 in the Periodic Table of Elements;

Cp represents a cyclopentadienyl ring which is $\eta^5$-linkable to the core metal M, or a fused ring containing a cyclopentadienyl ring, in which the cyclopentadienyl ring or the fused ring containing a cyclopentadienyl ring may be further substituted by one or more substituents selected from (C1-C20)alkyl, (C6-C30)aryl, (C2-C20)alkenyl and (C6-C30)ar(C1-C20)alkyl;

$R^1$ through $R^4$ independently represent hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or each of $R^1$ through $R^4$ may be linked to an adjacent substituent via (C3-C12)alkylene or (C3-C12)alkenylene with or without containing a fused ring to form an alicyclic ring, or a monocyclic or polycyclic aromatic ring;

$Ar^1$ represents (C6-C30)aryl or (C3-C30)heteroaryl containing one or more heteroatom(s) selected from N, O and S;

$X^1$ and $X^2$ independently represent halogen atom, (C1-C20)alkyl, (C3-C20)cycloalkyl, (C6-C30)ar(C1-C20)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio, or

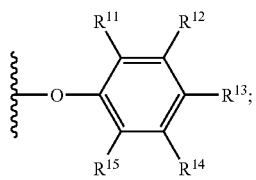

$R^{11}$ through $R^{15}$ independently represent hydrogen atom, halogen atom, (C1-C20)alkyl, (C3-C20)cycloalkyl, (C6-C30)aryl, (C6-C30)ar(C1-C10)alkyl, (C1-C20)alkoxy, (C3-C20)alkylsiloxy, (C6-C30)arylsiloxy, (C1-C20)alkylamino, (C6-C30)arylamino, (C1-C20)alkylthio, (C6-C30)arylthio or nitro, or each of $R^{11}$ through $R^{15}$ may be linked to an adjacent substituent via (C3-C12)alkylene or (C3-C12)alkenylene with or without containing a fused ring to form an alicyclic ring, or a monocyclic or polycyclic aromatic ring; and the alkyl, aryl, cycloalkyl, aralkyl, alkoxy, alkylsiloxy, arylsiloxy, alkylamino, arylamino, alkylthio or arylthio of $R^1$ through $R^4$, $R^{11}$ through $R^{15}$, $X^1$ and $X^2$; the ring formed by linkage of each of $R^1$ through $R^4$ or $R^{11}$ through $R^{15}$ to an adjacent substituent via alkylene or alkenylene; and aryl or heteroaryl of $Ar^1$ and $Ar^{11}$ may be further substituted by one or more substituent(s) selected from halogen atom, (C1-C20) alkyl, (C3-C20)cycloalkyl, (C6-C30)aryl, (C6-C30)ar(C1-C10)alkyl, (C1-C20)alkoxy, (C3-C20)alkylsiloxy, (C6-C30) arylsiloxy, (C1-C20)alkylamino, (C6-C30)arylamino, (C1-C20)alkylthio, (C6-C30)arylthio, nitro and hydroxyl.

In order for the transition metal catalyst of Chemical Formula (1) to become an active catalyst component for olefin polymerization, an aluminum compound or boron compound, or a mixture thereof, which can extract X ligand from the transition metal compound to make the core metal become a cation, while serving as a counterion (anion) with weak bond strength, is employed as cocatalyst. Though the organo-aluminum compound used herein is to remove trace amount of polar substances (which functions as catalyst poison in the reaction solvent), it may serve as an alkylating agent when X ligand is halogen.

Boron compounds which can be used as cocatalyst according to the present invention can be selected from the compounds represented by one of Chemical Formulas (2) to (4), as can be found in U.S. Pat. No. 5,198,401.

| | |
|---|---|
| $B(R^{31})_3$ | [Chemical Formula 2] |
| $[R^{32}]^+[B(R^{31})_4]^-$ | [Chemical Formula 3] |
| $[(R^{33})_qZH]^+[B(R^{31})_4]^-$ | [Chemical Formula 4] |

In Chemical Formulas (2) to (4), B represents boron atom; $R^{31}$ represents phenyl, which may be further substituted by three to five substituents selected from fluorine atom, (C1-C20)alkyl with or without fluorine substituent(s), or (C1-C20)alkoxy with or without fluorine substituent(s); $R^{32}$ represents (C5-C7)cycloalkyl radical, (C1-C20)alkyl(C6-C20) aryl radical, or (C6-C30)ar(C1-C20)alkyl radical such as triphenylmethyl radical; Z represents nitrogen or phosphorus atom; $R^{33}$ represents (C1-C20)alkyl radical or anilinium radical which is substituted by two (C1-C4)alkyl group together with nitrogen atom; and q is an integer of 2 or 3.

The molar ratio of core metal M:boron atom preferably is 1:0.1~50, more preferably 1:0.5~15.

The aluminum compounds which are usable according to the present invention include aluminoxane compounds represented by Chemical Formula (5) or (6), organo-aluminum compounds represented by Chemical Formula (7) and organo-aluminum hydrocarbyloxide compounds represented by Chemical Formula (8) or (9).

| | |
|---|---|
| $(-Al(R^{41})-O-)_m$ | [Chemical Formula 5] |
| $(R^{41})_2Al-(-O(R^{41})-)_p-(R^{41})_2$ | [Chemical Formula 6] |
| $(R^{42})_rAl(E)_{3-r}$ | [Chemical Formula 7] |
| $(R^{43})_2AlOR^{44}$ | [Chemical Formula 8] |
| $R^{43}Al(OR^{44})_2$ | [Chemical Formula 9] |

In Chemical Formulas (5) to (9), $R^{41}$ represents linear or nonlinear (C1-C20)alkyl, preferably methyl or isobutyl; each of m and p represents an integer from 5 to 20; $R^{42}$ and $R^{43}$ represent (C1-C20)alkyl; E represents hydrogen atom or halogen atom; r is an integer from 1 to 3; and $R^{44}$ may be selected from (C1-C20)alkyl and (C6-C30)aryl.

The molar ratio of the core metal M:aluminum atom is preferably from 1:1 to 1:2,000, more preferably from 1:5 to 1:1,000.

The molar ratio of the core metal M:boron atom:aluminum atom preferably is 1:0.1~50:1~1,000, more preferably 1:0.5~15:5-500.

2. Solution Polymerization Process

Since ethylene polymerization of the present invention is carried out with at least two stages, two or more reactors are required. Two or three polymerization stages are performed to give broad molecular weight distribution.

The present invention provides a process for preparing ethylene copolymer, which comprises (a) polymerizing ethylene and one or more (C3-C18) α-olefin comonomer(s) in the presence of a catalyst composition containing a transition metal catalyst represented by Chemical Formula (1) in one or more reactor(s) to produce a first copolymer; and (b) passing the first copolymer prepared from stage (a) through at least one other reactor(s) containing ethylene or ethylene and at least one (C3-C18) α-olefin at a temperature higher than the reaction temperature of stage (a) in the presence of the same catalyst composition employed in stage (a), in order to prepare polymer of high temperature which contains ethylene and (C3-C18) α-olefin copolymer composition.

Further, the present invention provides a process for preparing ethylene copolymer, which comprises (a) polymerizing ethylene and one or more (C3-C18) α-olefin comonomer(s) in the presence of a catalyst composition containing a transition metal catalyst represented by Chemical Formula (1) in one or more reactor(s) to produce a first copolymer; (b) reacting the ethylene or ethylene and one or more (C3-C18) α-olefin at a temperature higher than the reaction temperature of stage (a) in the presence of the same catalyst composition employed in stage (a) in at least one other reactor(s), in order to prepare a second copolymer; and (c) mixing the first copolymer with the second copolymer.

According to the present invention, the ethylene copolymer is prepared at a temperature from 80 to 210° for stage (a), and from 90 to 220° for stage (b), under pressure of 20~500 atm for each stage.

In stage (a), polymerization is carried out in the presence of said catalyst or catalyst composition, at a temperature from 80 to 210° C., more preferably from 80 to 150° C. under a pressure from 20 to 500 atm, more preferably from 30 to 200 atm. If the reaction temperature is lower than 80° C., the polymer can be hardly produced because the reaction would not occur due to precipitation or insufficient dispersion of the reactants. If it exceeds 210° C., it is impossible to prepare the polymer having predetermined molecular weight. If the pressure is not within the above mentioned range, it is difficult to obtain the polymer having the molecular weight desired.

Thereafter, in stage (b), the polymer prepared from stage (a) is copolymerized with α-olefin in the presence of the same catalyst or catalyst composition used for stage (a) at a temperature from 90 to 220° C., more preferably from 120 to 200° C., under the same pressure as in stage (a). If the temperature is lower than 90° C., polymer may be precipitated, or similar polymer to that obtained from stage (a) is prepared to eliminate the effect of multi-stage polymerization. If the temperature exceeds 220° C., the molecular weight of the polymer becomes too low to impair its physical properties. With regard to the pressure, corresponding results are obtained as in stage (a).

In the meanwhile, the present invention aims at control of physical properties of ethylene copolymer having uniform molecular weight and multi-modal density distribution by means of different process conditions such as amount of ethylene or hydrogen, and conversion in stage (a) or (b). Particularly, it is intended to improve the physical properties of final resin such as tensile strength and impact strength by optimizing tie molecules in the molecular structure by means of predetermined proportion of high molecular, low-density polymer in stage (a). In stage (b) after (a), same catalyst or catalyst composition is used but the polymerization is performed at a higher temperature to provide ethylene copolymer having different range of molecular weight and density from the polymer prepared in stage (a). Due to the features of the transition metal catalyst according to the invention, the resultant polymer could not help exhibiting narrow molecular weight distribution and density distribution. However, broad molecular weight and density distribution as desired by the manufacturer can be obtained through the multi-stage reaction.

Throughout the multi-stage reaction, arrangement of the reactors may be in series or in parallel.

FIG. 1 is a schematic view of reactors arranged in series, according to one preferable embodiment of the present invention. As referring to FIG. 1, the reactors in series include a stage-1 feed pump (11), a stage-1 feed cooler (12), a feed heater (13) of stage-1 reactor, a stage-1 low-temperature reactor (14), a catalyst feed (15) of stage-1 low-temperature reactor, a stage-2 high-temperature reactor connected in series (16), a catalyst feed (17) of stage-2 high-temperature reactor, a feed pump (18) of stage-2 reactor, a feed cooler (19) of stage-2 reactor, a feed heater (20) of stage-2 reactor, a feed (21) of stage-2 reactor and a hydrogen feed (22).

Thus, the reaction in series according to the invention comprises feeding the reactants excluding catalyst to the stage-1 low-temperature reactor (14) equipped with the feed cooler (12) of stage-1 reactor and the feed heater (13) of stage-1 reactor through the feed pump (11) of stage-1 reactor; feeding the catalyst through the catalyst feed (15) of stage-1 low-temperature reactor; and carrying out stage (a) at a lower temperature than that of stage-2. The polymer obtained via stage (a) is directly fed to the stage-2 high-temperature reactor connected in series (16) equipped with a feed cooler (19) of stage-2 reactor and a feed heater (20) of stage-2 reactor; the catalyst is fed through the catalyst feed (17) of stage-2 high-temperature reactor; and the reactants to the stage-2 reactor feed (21) through the feed pump (18) of stage-2 reactor, and hydrogen through the hydrogen feed (22); and polymerization of stage (b) is carried out at a higher temperature than that of stage (a). For the reactors connected in series, the overall reactor system has to be designed and controlled by considering ethylene conversion and catalytic activity in stage-1 reaction.

FIG. 2 is a schematic view of reactors arranged in parallel, according to one preferable embodiment of the present invention. As referring to FIG. 2, the reactors in parallel include a feed pump (31) of low-temperature reactor, a feed pump (32) of high-temperature reactor, a feed cooler (33) of low-temperature reactor, a feed heater (34) of low-temperature reactor, a feed cooler (35) of high-temperature reactor, a feed heater (36) of high-temperature reactor, a low-temperature reactor (37), a catalyst feed (38) of low-temperature reactor, a catalyst feed (39) of high-temperature reactor, a high-temperature reactor (40), an in-line mixer (41), a feed (42) of the high temperature reactor, and a hydrogen feed (43).

Thus, stage (a) of the reaction in reactors in parallel is carried out by feeding the reactants (excluding catalyst) through the feed pump (31) of the low-temperature reactor to the low temperature reactor (37) (in which temperature is controlled by the feed cooler (33) of the low temperature reactor and the feed heater (34) of the low temperature reactor); and adding catalyst through the catalyst feed (38) of the low temperature reactor.

Separately from stage (a), reaction is carried out at a higher temperature than that of stage (a), by feeding the reactants (excluding catalyst) through the feed pump (32) of the high-temperature reactor to the high temperature reactor (40) (in which temperature is controlled by the feed cooler (35) of the high temperature reactor and the feed heater (36) of the high temperature reactor), and then through the feed (42) of the high temperature reactor, together with hydrogen feed (43); and adding catalyst through the catalyst feed (39) of the high temperature reactor. The low temperature and high temperature reactants are mixed in an in-line mixer (41) to give homogeneous copolymer.

For the reaction in such reactors in parallel, an in-line mixer is used for homogeneous mixing of the solution from each reactor, in order to provide uniform physical properties of the copolymer. For the purpose of obtaining homogeneous copolymer, any possible unit such as stirred tank as well as an in-line mixer may be employed.

In stages (a) and (b) of the present invention, preferable amounts of ethylene and one or more (C3-C18) α-olefin comonomer are 60~99% by weight of ethylene and 1~40% by weight of α-olefin comonomer, respectively. When ethylene content is lower than 60%, physical properties become poor since the desired properties of ethylene do not appear because of the low ethylene content. If it is higher than 99% by weight, effect of copolymer would be lowered.

In stages (a) and (b), specific examples of (C3-C18) α-olefin comonomer include propylene, 1-butene, 1-pentene, 4-methyl-1-pentene, 1-hexene, 1-octene, 1-decene, 1-dodecene, and mixtures thereof. Among them, more preferable are 1-butene, 1-hexen, 1-octene or 1-decene.

In stages (a) and (b), preferable organic solvent for polymerization is C30-C20 hydrocarbon. Specific examples of solvent include butane, isobutane, pentane, hexane, heptane, octane, isooctane, nonane, decane, dodecane, cyclohexane, methylcyclohexane, benzene, toluene, xylene, and the like. Examples of commercially available solvent suitable for the process are solvent of SK-ISOL series, a type of isoparaffin solvent. For example, SK-ISOL E (available from SK Energy) is (C8~C12)aliphatic hydrocarbon solvent having the distillation range of 117~137.

Ethylene copolymers prepared according to the process of the invention is characterized in that they comprise 10~70% by weight of the polymer prepared from stage (a) and 30~90% by weight of the polymer prepared from stage (b); and the polymer from stage (a) has MI of 0.001 to 2.0 g/10 min and density of 0.860 to 0.925 g/cm$^3$, and the polymer from stage (b) is ethylene copolymer having MI of 0.1 to 100.0 g/10 min and density of 0.900 to 0.970 g/cm$^3$.

First, the polymer prepared from stage (a) is contained in an amount of 10~70% by weight, preferably 20~60% by weight. If the polymer content from stage (a) is lower than 10% by weight, improvement in impact strength would not occur. If the content exceeds 70% by weight, transparency is noticeably deteriorated when being processed into film, so that high energy is required for processing, with low productivity.

Molecular weight of the polymer prepared from stage (a), which is based on measurement of MI (melt index) according to ASTM D2839, is MI of 0.001 to 2.0 g/10 min, more preferably from 0.005 to 1.0 g/10 min. If MI of the polymer prepared from stage (a) is less than 0.001 g/10 min, the polymer prepared would be too stiff to result in poor processibility. If it is higher than 2.0 g/10 min, noticeable improvement would not appear in overall physical property of the polymer such as tensile strength and impact strength.

Density of the polymer produced from stage (a) is from 0.860 to 0.925 g/cm$^3$, more preferably from 0.880 to 0.915 g/cm$^3$. If the density is lower than 0.860 g/cm$^3$, the film prepared would have poor physical properties. If it exceeds 0.925 cm$^3$, the film would be too stiff. The polymer prepared from stage (a) would be resin having low density range. This is to improve the physical properties of finally produced resin by synthesizing resin with uniform copolymerization comonomer distribution in the polymer chain by means of transition metal catalyst with single activation point, differently from Ziegler-Natta catalyst which provides heterogeneous copolymer distribution in the polymer chain.

On the other hand, the polymer prepared from stage (b) is contained in an amount of 30~90% by weight, more preferably 40~80% by weight. If the polymer content from stage (b) is lower than 30% by weight, processibility of final resin (owing to the high molecular weight, low density ethylene copolymer prepared from stage (a)) and transparency of the film become poor. If the content exceeds 90% by weight, content of the polymer prepared from stage (a) (which provides good physical properties) becomes low, thereby resulting in lowered environmental resistance, impact strength, tensile strength of the resin.

Molecular weight of the polymer prepared from stage (b), which is based on measurement of MI (melt index) according to ASTM D2839, is MI of 0.1 to 100.0 g/10 min, more preferably from 0.3 to 50.0 g/10 min. If MI of the polymer prepared from stage (b) is less than 0.1 g/10 min, the molecular weight range is overlapped with the polymer prepared from stage (a), so that the molecular weight distribution would not be broad enough to achieve advantage of multi-stage reaction. If it exceeds 100 g/10 min, the physical properties would become poor because of low molecular weight.

Density of the polymer produced from stage (b) is preferably from 0.900 to 0.970 g/cm$^3$. If the density is lower than 0.900 g/cm$^3$, the density is overlapped with the density range of the polymer prepared from stage (a), so that the effect of polymerization stepwise would be eliminated. If it exceeds 0.970 cm$^3$, it would be troublesome because the film prepared therefrom is too stiff. Thus, the density range of the polymer prepared from stage (a) and that of the polymer from stage (b) should be adjusted to optimize the physical properties of the resin.

The ethylene copolymer prepared according to the inventive process include linear low density polyethylene copolymer (LLDPE) having the density of 0.910~0.940 g/cm$^3$, and very low density polyethylene copolymer (VLDPE or ULDPE) having the density of 0.900~0.910 g/cm$^3$.

The ethylene copolymer prepared according to the inventive process has the molecular weight distribution index of 2.3~30.

The present invention is designed to overcome the processibility of ethylene copolymer prepared by using conventional single activation point catalyst (characterized by narrow molecular weight distribution), due to at least bimodal molecular weight distribution of the polymer through the multi-stage reaction process.

For this, the molecular weight distribution index (weight average molecular weight divided by number average molecular weight) of the ethylene copolymer prepared by using the process and catalyst according to the invention is controlled to be in the range from 2.3 to 30, in order to improve processibility as well as physical properties.

Thus, the ethylene copolymers prepared through stage (a) and (b) described above may be those having the molecular weight distribution index of 2.3~30. When the molecular weight distribution index is less than 2.3, no significant difference is found as compared to the case using a single reactor and single activation point catalyst, and effect of controlling density and molecular weight distribution index disappears to result in poor improvement in processibility or physical properties.

According to the present invention, ethylene and (C3-C18) α-olefin comonomer (which are fed to stage (a) or (b)) are dissolved in solvent before being fed to the reactor. Before mixing and dissolving, ethylene, comonomer and solvent are subjected to purification process to remove impurities including moisture, oxygen, carbon monoxide and other metallic impurities (which may act as potential catalyst poison). Substances to be used in such purification include molecular sieves, activated aluminum, and silica gel as well known in the corresponding field.

The substances to be incorporated to stage (a) and (b) are cooled or heated through heat exchange process before being fed. The temperature inside the reactor is controlled through this process. Thus, temperature control of the reactor is an adiabatic reactor process without heat exchange through the reactor wall. Control of reaction heat alters the temperature of solvent stream and monomer flow into the reactor.

After stage (b), ethylene, comonomer, catalyst or solvent may be additionally fed according to the invention. Temperature of these components is also controlled to predetermined temperature via heat exchange. In general, catalyst is fed separately from other substances, preferably being previously mixed or dissolved with/in solvent.

Molecular weight and density of the stage [when the polymer is prepared via two- or multi-stage reaction] are analyzed after stage (b); or physical properties of polymers prepared via further stages are analyzed by sampling the resin after stage (a), and those of finally produced polymer after stage (b) are analyzed, so that density, molecular weight of the polymers, and the like are calculated for each stage.

For measuring physical properties, they can be analogized by the physical properties of the polymer obtained by carrying out the reaction of each stage [(a) or (b)] in a single reactor under identical polymerization condition (such as temperature, pressure, solvent, reactants, catalyst and reaction time). Otherwise, they can be analyzed by calculating the values corresponding to each stage of the multi-stage reaction, as reported (B. Hagstrom Conference on Polymer Processing, 1977).

In the meanwhile, residence time in stage (a) or (b) is determined by the designed volume and output per time for each stage. In order to maintain the operation condition with homogeneity of the substances, appropriate stirring is required for stage (a) and (b). Finally prepared ethylene polymer or ethylene copolymer is recovered through appropriate process for removing solvent.

Advantageous Effects

The ethylene copolymers having multi-modal molecular weight distribution according to the present invention, which is prepared via multi-stage synthesis of ethylene or α-olefin, show the effect of improved physical properties (including impact resistance) as well as processability.

Thus, ethylene copolymers having controlled softening point and different impact resistance can be produced with high productivity, and the copolymers can be applied to various usage with controlled physical properties.

DESCRIPTION OF DRAWINGS

The above and other objects, features and advantages of the present invention will become apparent from the following description of preferred embodiments given in conjunction with the accompanying drawings.

DETAILED DESCRIPTION OF MAIN ELEMENTS

Figure 1:
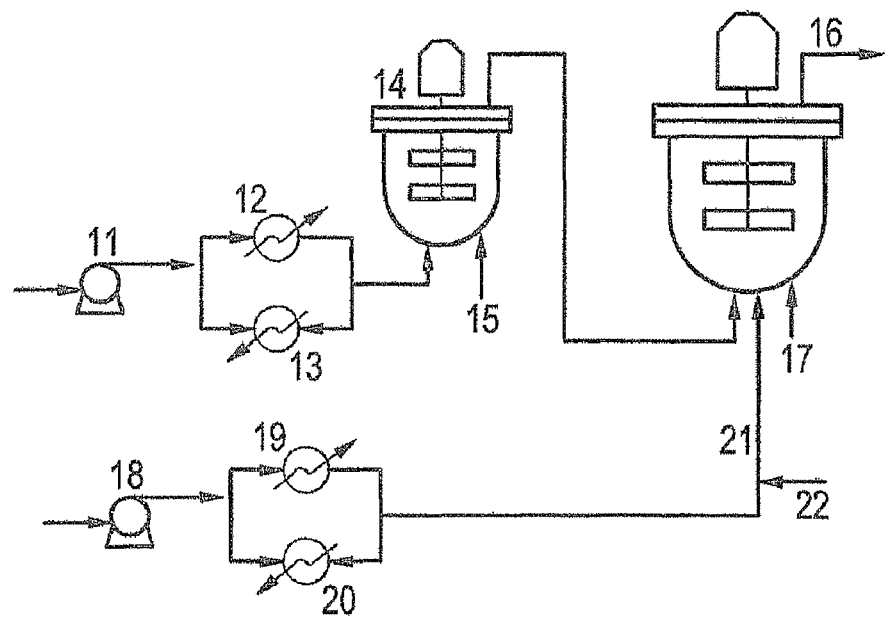
FIG. 1 is a schematic view of reactors in series in accordance with a preferable embodiment of the present invention.
Figure 2:
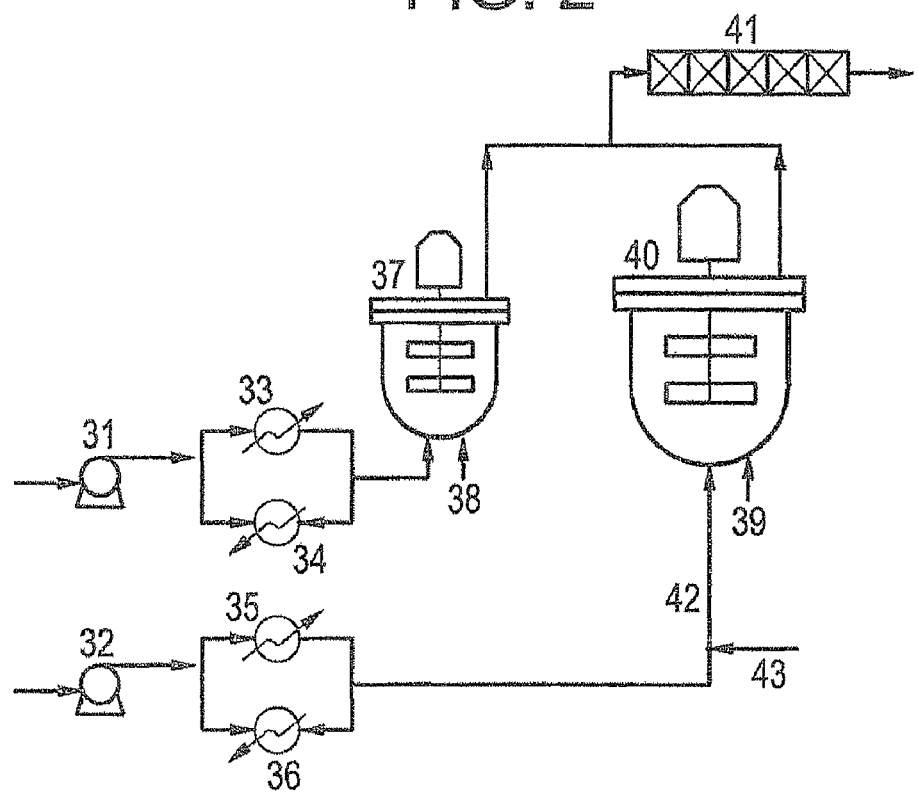
FIG. 2 is a schematic view of reactors in parallel in accordance with a preferable embodiment of the present invention.

11: feed pump of stage-1 reactor
12: feed cooler of stage-1 reactor
13: feed heater of stage-1 reactor
14: stage-1 low-temperature reactor
15: catalyst feed of stage-1 low-temperature reactor
16: stage-2 high-temperature reactor connected in series
17: catalyst feed of stage-2 high-temperature reactor
18: feed pump of stage-2 reactor
19: feed cooler of stage-2 reactor
20: feed heater of stage-2 reactor
21: feed of stage-2 reactor
22: hydrogen feed
31: feed pump of low-temperature reactor
32: feed pump of high-temperature reactor
33: feed cooler of low-temperature reactor
34: feed heater of low-temperature reactor
35: feed cooler of high-temperature reactor
36: feed heater of high-temperature reactor
37: low-temperature reactor
38: catalyst feed of low-temperature reactor
39: catalyst feed of high-temperature reactor
40: high-temperature reactor
41: in-line mixer
42: feed of stage-2 reactor
43: hydrogen feed

BEST MODE

Hereinafter, the present invention will be described in detail with reference to Examples, which are not intended to restrict the scope of the invention.

Unless being stated otherwise, all experiments for synthesizing the ligands and catalysts were carried out under nitrogen atmosphere with standard Schlenk or glove-box technique, and the organic solvents were used after they had been dried via reflux over sodium metal and benzophenone, and then distilled immediately before use. $^1$H-NMR analyses of the ligands and catalysts synthesized were performed by using Varian Mercury 300 MHz Spectrometer at ambient temperature.

As the solvent for polymerization, cyclohexane was passed through a tube filled with Q-5 catalyst (from BASF), silica gel and activated alumina, sequentially, and bubbled by nitrogen with high purity to sufficiently remove moisture, oxygen and other catalyst poison.

A film processed with polymerized polymer by a blown film molding machine was produced, and sheets were produced by a cast molding machine. The film and compressed sheets processed were analyzed by the methods described below.

1. Melt Flow Index (MI)
MI was measured according to ASTM D 2839.
2. Density
Density was measured by using density gradient tube, according to ASTM D 1505.
3. Analysis of Melting Temperature (Tm)
Tm was measured under $2^{nd}$ heating condition at a rate of 10/min in the presence of nitrogen atmosphere, by means of Dupont DSC2910.
4. Molecular Weight and Molecular Weight Distribution
Molecular weight was measured at 135 at a rate of 1.0 mL/min in the presence of 1,2,3-trichlorobenzene solvent by using PL210 GPC equipped with PL Mixed-BX2+preCol. Molecular weight was calibrated by using PL polystyrene standards.
5. Tensile Strength
Tensile strength was measured according to ASTM D638.
6. Falling Dart Impact Strength
Falling dart impact strength was measured according to ASTM D1709.
7. Haze
Haze was measured according to ASTM D1003.
8. Elmendorf Tear Strength
Elmendorf tear strength was measured according to ASTM D1922.
9. Content of Extractable Substances
The content can be determined from data obtained from analysis of temperature rising elution fractionation, by measuring the soluble fraction. The content was determined by proportion of the soluble fraction peak occurring after elution at 35 for 10 minutes to the overall crystallization peak.
10. High Speed Puncture Test
It is to measure deformation with controlling the change of speed of impact applied from outside, as desired (Instrumented Impact Tester Model No. ITR 2000, from McVan), which is determined according to ASTM D3763. Extrusion molded sheet of 2 mm of thickness was prepared and evaluated under 400 kG of pressure, with the distance of 165 mm from the specimen.

Preparation Example 1

Synthesis of bis(2-phenyl-4-fluorophenoxy)(pentamethylcyclopentadienyl)titanium (IV) chloride In diethyl ether (80 mL), dissolved was 2-phenyl-4-fluorophenol (1.90 g, 10.09 mmol), and butyl lithium (4.8 mL) (in 2.5 M hexane) was slowly added dropwise thereto at 0. After reacting for 5 hours at ambient temperature, solution of (trichloro)(pentamethylcyclopentadienyl)titanium (IV) (1.64 g, 5.5 mmol) in 10 mL of diethyl ether was slowly added dropwise thereto at −78. The mixture was stirred at ambient temperature for 12 hours, and filtered and evaporated to remove volatiles. Recrystallization from toluene/hexane mixture at −35 gave orange solid (2.54 g).

Yield: 85%

$^1$H NMR ($C_6D_6$) δ=1.46 (s, 15H), 6.65~7.57 (m, 8H).

All experiments in Examples were carried out according to the continuous solution polymerization process as described below.

Examples 1~7

As single activation point catalyst for stage-1 and stage-2 reactors connected in series, employed was bis(pentamethylcyclopentadienyl)(2-phenyl-4-fluorophenoxy)titanium (IV) chloride prepared from Preparation Example 1. The amounts of catalyst used are shown in Table 1. Ti represents single activation point catalyst, Al represents triisobutylaluminum as cocatalyst, and B represents triphenylmethyliniumtetrakispentafluorophenyl borate. Each catalyst was dissolved in xylene at a concentration of 0.2 g/L, 5.0 g/L or 1.5 g/L. For each reactor, ethylene feed ratio was 4:6, and 1-octene was used as comonomer. However, the amount of ethylene to be fed to the stage-2 reactor should be determined, when the conversion is low, as considering the amount of unreacted ethylene flowing into the second reactor, in order to adjust the polymer density and molecular weight from the first reactor. Conversion of each reactor can be estimated for individual reaction condition, through the reaction condition for polymerizing one type of polymer, and temperature gradient in the reactor. In order to produce copolymer with relatively high MI in the second reactor, an appropriate amount of hydrogen was injected to control the molecular weight. Furthermore, molecular weight from each reactor may be controlled as a function of the reactor temperature and 1-octene content, of which the conditions are shown in Table 1.

The ethylene copolymers in Examples were prepared with different density structure by employing identical catalytic system and process, and MI of the final ethylene copolymer was between 0.8 and 1.3. The copolymerization was carried out to give identical molecular weight, as far as possible, under the conditions listed in Table 1.

The ethylene copolymer thus prepared was extruded at barrel temperature of 160-170-170, and die temperature of 175, to prepare blown film having thickness of 40 μm and width of 530 mm.

Examples 8~14

Sheet of 2 mm of thickness was prepared under extrusion molding conditions: Each ethylene copolymer prepared from Examples 1 to 7 was pre-heated at 190 of mold temperature under pressure of 0.5 ton for 5 minutes, and melted under pressure of 15 ton for 1 minute. Then the copolymer was cooled in a mold with water-cooling at ambient temperature under pressure of 15 ton for 2 minutes.

Comparative Example 1

Copolymer with 1-octene having monomodal molecular weight distribution (FN810 Grade commercially available from SK Energy), of which physical properties are shown in Table 2. The ethylene copolymer was processed into blown film having 40 μm of thickness and 530 mm of width by extrusion at barrel temperature of 160-170-170° C. and die temperature of 175° C., and the physical properties were comparatively examined.

Comparative Example 2

Copolymer with 1-octene having monomodal molecular weight distribution (a lot without blending with LDPE, but having low density, among FH811U Grade commercially available from SK Energy), of which physical properties are shown in Table 2. The ethylene copolymer was processed into blown film, just as in Comparative Example 1, and the physical properties were comparatively examined.

Comparative Example 3

Copolymer with 1-octene having monomodal molecular weight distribution (product without blending with LDPE, among FH811U Grade commercially available from SK Energy), of which physical properties are shown in Table 2. The ethylene copolymer was processed into blown film, just as in Comparative Example 1, and the physical properties were comparatively examined.

Comparative Example 4

Copolymer with 1-octene having monomodal molecular weight distribution (FN800 Grade commercially available from SK Energy), of which physical properties are shown in Table 2. The ethylene copolymer processed into blown film, just as in Comparative Example 1, and the physical properties were comparatively examined.

Comparative Examples 5~8

Ethylene copolymers prepared from Comparative Examples 1~4 were individually processed into sheet with thickness of 2 mm, via extrusion molding, as described in Examples 8~14.

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Total flow of solution (kg/h) | | 10.9 | 10.9 | 10.9 | 10.9 | 10.9 | 10.9 | 10.9 |
| Ethylene ratio ($1^{st}$ stage:$2^{nd}$ stage) | | 4:6 | 4:6 | 4:6 | 4.5:5.5 | 4:6 | 4:6 | 4:6 |
| Ratio of 1-octene to ethylene | $1^{st}$ Reactor | 0.29 | 0.25 | 0.23 | 0.23 | 0.25 | 0.21 | 0.19 |
| | $2^{nd}$ Reactor | 0.1 | 0.1 | 0.11 | 0.1 | 0.08 | 0.08 | 0.08 |

TABLE 1-continued

|  |  | Ex. 1 | Ex. 2 | Ex. 3 | Ex. 4 | Ex. 5 | Ex. 6 | Ex. 7 |
|---|---|---|---|---|---|---|---|---|
| Amount of Ti (μmol/kg) | $1^{st}$ Reactor | 2.3 | 2.1 | 2.3 | 2.2 | 2.3 | 2.1 | 2.1 |
|  | $2^{nd}$ Reactor | 7.8 | 7.9 | 7.9 | 8.2 | 7.9 | 7.9 | 8.2 |
| Al/Ti ratio |  | 60 | 60 | 60 | 60 | 60 | 60 | 60 |
| B/Ti ratio |  | 3 | 3 | 3 | 3 | 3 | 3 | 3 |
| Hydrogen feed to $2^{nd}$ reactor (ppm) |  | 2 | 3 | 2 | 4 | 2 | 3 | 4 |
| Reaction temperature (°) | $1^{st}$ Reactor | 115 | 105 | 112 | 107 | 112 | 104 | 103 |
|  | $2^{nd}$ Reactor | 172 | 174 | 173 | 177 | 173 | 174 | 175 |
| Polymer from $1^{st}$ Reactor | MI | 0.09 | 0.05 | 0.07 | 0.05 | 0.07 | 0.04 | 0.03 |
|  | Density | 0.901 | 0.904 | 0.907 | 0.907 | 0.905 | 0.909 | 0.911 |
| Final ethylene copolymer | MI | 1.2 | 1.0 | 1.1 | 0.95 | 1.1 | 0.92 | 1.0 |
|  | Density | 0.9167 | 0.917 | 0.918 | 0.9185 | 0.9201 | 0.922 | 0.9236 |
| GPC of final ethylene copolymer | Number average MW | 30600 | 32200 | 31900 | 33100 | 31900 | 33800 | 31000 |
|  | Weight average MW | 87300 | 95200 | 92400 | 99900 | 92200 | 102900 | 116600 |
|  | MW distribution index | 2.85 | 2.96 | 2.90 | 3.01 | 2.89 | 3.04 | 3.76 |

Ethylene ratio = $1^{st}$ reactor : $2^{nd}$ reactor
Ti: referring to Ti in single activation point catalyst
Al: referring to triisobutylaluminum as cocatalyst
B: referring to triphenylmethyliniumtetrakispentafluorophenyl borate as cocatalyst

TABLE 2

|  |  | Comp. Ex. 1 | Comp. Ex. 2 | Comp. Ex. 3 | Comp. Ex. 4 |
|---|---|---|---|---|---|
| Final ethylene copolymer | MI | 0.9 | 1.0 | 0.7 | 1.0 |
|  | Density | 0.919 | 0.923 | 0.926 | 0.928 |
| GPC of final ethylene copolymer | Number average MW | 32400 | 31100 | 38900 | 30800 |
|  | Weight average MW | 123700 | 117200 | 152200 | 116300 |
|  | MW distribution index | 3.82 | 3.77 | 4.01 | 3.78 |

TABLE 3

|  | Physical properties of ethylene copolymer | | Physical properties of film | | | Physical property of extrusion molded |
|---|---|---|---|---|---|---|
|  | Vicat softening point (° C.) | Content of extractable (wt %) | Elmendorf tear strength (MD, g/μ) | Haze (%) | falling dart impact strength (g) | sheet High rate impact strength (N) |
| Ex. 1 | 102.1 | 1.5 | 11.0 | 8.9 | 1100 | — |
| Ex. 2 | 103.4 | 1.4 | 10.8 | 9.3 | 1010 | — |
| Ex. 3 | 106.0 | 1.0 | 10.4 | 10.6 | 920 | — |
| Ex. 4 | 107.4 | 0.8 | 10.0 | 12.0 | 900 | — |
| Ex. 5 | 108.2 | 0.7 | 10.3 | 11.8 | 810 | — |
| Ex. 6 | 110.4 | 0.5 | 10.0 | 13.6 | 570 | — |
| Ex. 7 | 112.9 | 0.3 | 9.5 | 15.5 | 435 | — |
| Ex. 8 | 102.1 | 1.5 | — | — | — | 24.7 |
| Ex. 9 | 103.4 | 1.4 | — | — | — | 23.8 |
| Ex. 10 | 106.0 | 1.0 | — | — | — | 22.4 |
| Ex. 11 | 107.4 | 0.8 | — | — | — | 22.0 |
| Ex. 12 | 108.2 | 0.7 | — | — | — | 22.6 |
| Ex. 13 | 110.4 | 0.5 | — | — | — | 21.1 |
| Ex. 14 | 112.9 | 0.3 | — | — | — | 20.9 |
| Comp. Ex. 1 | 106.8 | 4.0 | 17.8 | 31.6 | 280 | — |
| Comp. Ex. 2 | 110.0 | 3.5 | 13.0 | 33.0 | 265 | — |
| Comp. Ex. 3 | 115.1 | 1.4 | 10.6 | 31.8 | 250 | — |
| Comp. Ex. 4 | 115.3 | 1.2 | 8.6 | 26.7 | 225 | — |
| Comp. Ex. 5 | 106.8 | 4.0 | — | — | — | 17.8 |
| Comp. Ex. 6 | 110.0 | 3.5 | — | — | — | 16.9 |

TABLE 3-continued

| | Physical properties of ethylene copolymer | | Physical properties of film | | | Physical property of extrusion molded |
|---|---|---|---|---|---|---|
| | Vicat softening point (°C.) | Content of extractable (wt %) | Elmendorf tear strength (MD, g/μ) | Haze (%) | falling dart impact strength (g) | sheet High rate impact strength (N) |
| Comp. Ex. 7 | 115.1 | 1.4 | — | — | — | 15.9 |
| Comp. Ex. 8 | 115.3 | 1.2 | — | — | — | 14.3 |

Tables 1 and 2 show the polymerization conditions and physical properties of polymers produced under individual condition in Examples 1 to 14 and Comparative Examples 1 to 8.

Table 3 shows the physical properties of films prepared from Examples 1 to 7 and Comparative Examples 1 to 4, and those of extrusion molded sheet prepared from Examples 8 to 14 and Comparative Examples 5 to 8. It is found from Table 3 that most of the physical properties of the films according to the invention were improved in spite of similar level of MI and density. All polymers from Examples and Comparative Examples were prepared with comparable MI's, but with different densities.

Figure 3:
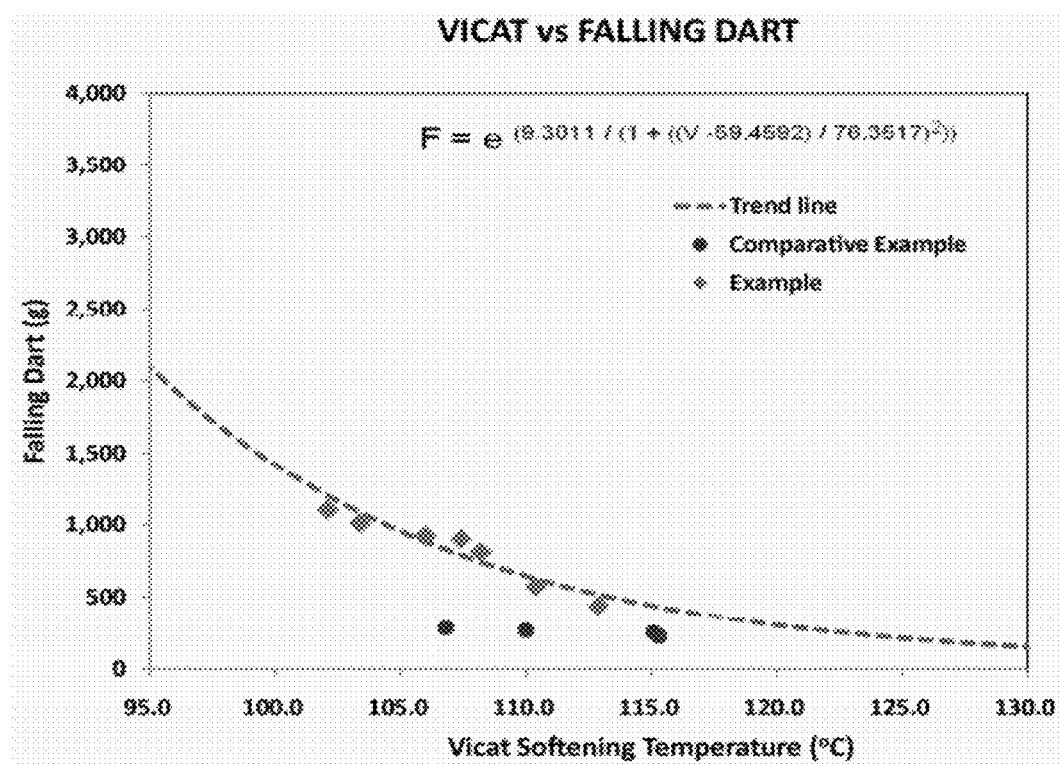
FIG. 3 shows the data of falling dart impact strength of a preferable embodiment of the present invention.

As comparing the physical properties in terms of Vicat softening point, it is found as in Table 3, improvement in falling dart impact strength goes proportional to the softening point, and the polymers from Examples 1 to 7 gave higher impact resistance than those from Comparative Examples 1 to 4. The results are shown in FIG. 3, which is a graph of falling dart impact strength resulted from one preferable embodiment of the invention, versus the softening point.

Figure 4:
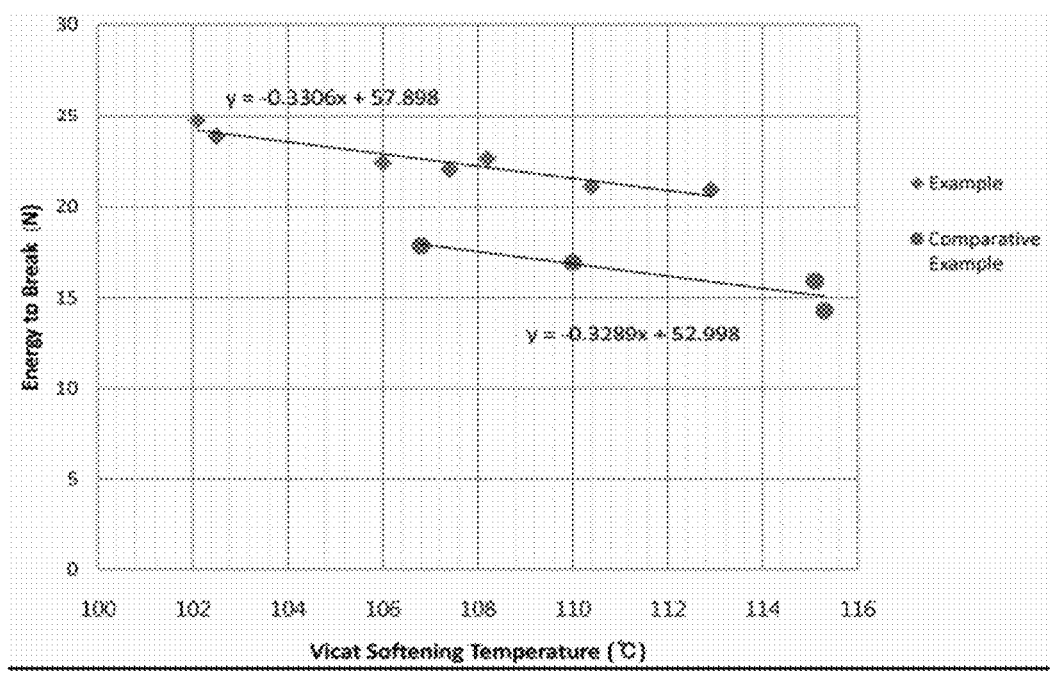
FIG. 4 shows the data of high rate impact strength of a preferable embodiment of the present invention.

Further, high rate impact energy evaluated with extrusion molded sheets showed better results in Examples 8 to 14, as compared to those in Comparative Examples 5 to 8. The results are shown in FIG. 4, which is a graph of high rate impact strength in accordance with one preferable embodiment of the present invention. The graph shows high rate impact energy versus softening point.

In the meanwhile, it is found that polymers from Examples 1 to 7 show excellent transparency (Haze) regardless of alteration of softening point. Same advantage is found in content of extractable substances.

Though the present invention is described in detail with referring to Examples as above and drawings accompanied, a person having ordinary skill in the art in the field of industry to which the invention belongs can make various replacement, modification or alteration without departing from the spirit or scope of the invention, which was defined by appended claims.

INDUSTRIAL APPLICABILITY

From the ethylene copolymers prepared via stages (a) and (b), or (a) through (c) according to the present invention, obtained can be molded articles of the ethylene copolymer, which are usable for mono-layered or multi-layered film, injected products, compounded products, sheet products, blown moldings, blown film, casting film, injection moldings, or pipe.

The film can be formed as blown film or casting film to provide mono-layered or multi-layered film for package. The copolymers can be applied to the use for shrinkage film, film for heavy package, film for freeze package, film for automatic package, stretch wrap, bags, or the like.

The invention claimed is:

1. Copolymer of ethylene with (C3~C18) α-olefin comonomer, having a density of 0.900 to 0.910 g/cm$^3$, and falling dart impact strength (F) satisfying the correlation with Vicat softening point as expressed by Formulas (1) and (2):

$$F \geq 0.55 \times e^{(9.3011/(1+((V-59.4592)/76.3517)^2))} + 15 \quad \text{[Formula 1]}$$

$$F \leq 1.7 \times e^{(9.3011/(1+((V-59.4592)/76.3517)^2))} + 200 \quad \text{[Formula 2]}$$

wherein, V represents Vicat softening point measured according to ASTM D 1525; and F represents falling dart impact strength measured according to ASTM D1709.

2. The ethylene copolymer according to claim 1, wherein the (C3~C18) α-olefin comonomer is selected from propylene, 1-butene, 1-pentene, 4-methyl-1-pentene, 1-hexene, 1-octene, 1-decene, 1-dodecene, or mixtures thereof.

3. The ethylene copolymer according to claim 2, wherein the content of α-olefin comonomer is from 1 to 40% by weight.

4. The ethylene copolymer according to claim 3, wherein the content of α-olefin comonomer is from 1 to 30% by weight.

5. The ethylene copolymer according to claim 4, which contains 0.1 to 3.0% by weight of extractable substances, determined by measurement of volatiles, wherein the measurement of volatiles is determined by analytic method of temperature rising elution fractionation applying elution at 35° C. for 10 minutes to the overall crystallization peak.

6. The ethylene copolymer according to claim 5, satisfying Formulas (1), (2) and (3):

$$F \leq 1.5 \times e^{(9.3011/(1+((V-59.4592)/76.3517)^2))} + 150 \quad \text{[Formula 3]}$$

wherein, V represents Vicat softening point measured according to ASTM D 1525; and F represents falling dart impact strength measured according to ASTM D1709.

7. The ethylene copolymer according to claim 6, satisfying Formula (4) as well as Formulas (1) to (3):

$$F \leq 1.3 \times e^{(9.3011/(1+((V-59.4592)/76.3517)^2))} + 100 \quad \text{[Formula 4]}$$

wherein, V represents Vicat softening point measured according to ASTM D 1525; and F represents falling dart impact strength measured according to ASTM D1709.

8. The ethylene copolymer according to claim 7, which has Haze of 2~16 measured according to ASTM D1003.

9. The ethylene copolymer according to claim 5, of which the high rate impact resistant breakage energy (E) value satisfies Formulas (5) and (6):

$$E \geq 0.9 \times (-0.3306V + 57.898) \quad \text{[Formula 5]}$$

$$E \geq 1.2 \times (-0.3306V + 57.898) \quad \text{[Formula 6]}$$

wherein, V represents Vicat softening point measured according to ASTM D 1525; and E represents high rate impact resistant breakage energy value measured according to ASTM D3763.

10. Blown film, manufactured by extruding the ethylene copolymers according to claim 1.

11. Sheet products, manufactured by applying the ethylene copolymers according to claim 1 under extrusion molding.

* * * * *